United States Patent
Lee et al.

(10) Patent No.: US 8,164,852 B2
(45) Date of Patent: Apr. 24, 2012

(54) MAGNETIC HEAD HAVING SHIELD AND RECORDING APPARATUS EMPLOYING THE SAME

(75) Inventors: Hoo-san Lee, Osan-si (KR); Hoon-sang Oh, Seongnam-si (KR); Sung-chul Lee, Osan-si (KR)

(73) Assignee: Seagate Technology International, Grand Cayman (KY)

( * ) Notice: Subject to any disclaimer, the term of this patent is extended or adjusted under 35 U.S.C. 154(b) by 978 days.

(21) Appl. No.: 12/142,903

(22) Filed: Jun. 20, 2008

(65) Prior Publication Data

US 2009/0141407 A1 Jun. 4, 2009

(30) Foreign Application Priority Data

Nov. 30, 2007 (KR) ........................ 10-2007-0123816

(51) Int. Cl.
*G11B 5/11* (2006.01)
*G11B 5/147* (2006.01)

(52) U.S. Cl. ................................. 360/125.03; 360/125.3
(58) Field of Classification Search .................. 360/317, 360/125.03, 125.3, 125.27, 125.28, 125.29
See application file for complete search history.

(56) References Cited

U.S. PATENT DOCUMENTS

| | | | | |
|---|---|---|---|---|
| 5,075,956 | A * | 12/1991 | Das ............................ | 29/603.14 |
| 7,573,683 | B1 * | 8/2009 | Benakli et al. ................ | 360/319 |
| 2006/0203381 | A1 * | 9/2006 | Okada et al. .................. | 360/125 |
| 2008/0088972 | A1 * | 4/2008 | Sasaki et al. .................. | 360/110 |

* cited by examiner

*Primary Examiner* — Jefferson Evans
(74) *Attorney, Agent, or Firm* — NSIP Law

(57) ABSTRACT

A magnetic head and a recording apparatus employing the same are provided. The magnetic head includes a recording member, a field inducing member inducing a magnetic field to the recording member, a shield member having the same direction of magnetization as the recording member in a recording operation, and a return path member forming a magnetic path with the recording member.

20 Claims, 9 Drawing Sheets

MAGNETIC HEAD HAVING SHIELD AND RECORDING APPARATUS EMPLOYING THE SAME

CROSS-REFERENCE TO RELATED PATENT APPLICATIONS

This application claims the benefit under 35 U.S.C. §119 (a) of a Korean Patent Application No. 10-2007-0123816, filed on Nov. 30, 2007, in the Korean Intellectual Property Office, the disclosure of which is incorporated herein in its entirety by reference.

TECHNICAL FIELD

The following description relates to a magnetic head and a recording apparatus employing the same, and more particularly, to a magnetic head having a shield and a magnetic recording apparatus employing the same.

BACKGROUND

In recent years, demands for a storage device such as a hard disk drive (HDD), with high storage capacity or recording density have steadily increased. The recording density of a magnetic recording apparatus such as a HDD may be determined according to a bits per inch (BPI) indicating the number of bits to be recorded in a unit length, and a tracks per inch (TPI) indicating the number of tracks to be included in a unit length. BPI indicates a linear recording density which is the density in a direction in which a disk rotates. TPI indicates a track density which is the density in a disk radial direction.

To increase the recording density of a magnetic recording apparatus, efforts have been made to increase the BPI and TPI. Due to the limitation in increasing the BPI, studies have been made to increase the recording density of a magnetic recording apparatus by increasing the TPI. One of the factors for dominating the TPI is the distribution of a field generated by a magnetic head of a magnetic recording apparatus. A track width may be determined by the distribution of the field, and the TPI may be determined by the track width.

In one case, a study has been made to reduce the distribution of a magnetic field by forming side shields at both sides of a main pole, to thereby increase the TPI and recording density of a magnetic recording apparatus. However, where side shields are used, the intensity of a magnetic field (a recording field) generated from a main pole may be reduced remarkably. In other words, while the distribution of a magnetic field in a track direction, for example, in a cross track direction, may be reduced by implementing the side shields, the intensity of the magnetic field may be also reduced. Accordingly, addressing the reduction in intensity of a magnetic field may be necessary where, for example, a coercivity force of a recording medium is increased gradually to improve the BPI and stability.

In another case, a discrete track recording method has been studied where tracks are separated from a recording medium by using a physical means. A discrete track medium, in which a discrete track recording method is used, has a structure in which ring-shaped data tracks are previously patterned. In this case, a region in which patterned data tracks are to be separated from one another is empty or is filled with a non-magnetic material. In a discrete track medium, interference between adjacent data tracks may be suppressed and minimized to increase the track density, thereby increasing the recording density of a magnetic recording apparatus. However, a photolithography technology which may not be currently used may be needed to manufacture such a magnetic recording medium.

SUMMARY

According to an aspect, there is provided a magnetic head comprising a main pole, a first coil inducing a magnetic field to the main pole, a side shield having the same direction of magnetization as the main pole in a recording operation, and a return pole forming a magnetic path with the main pole.

The side shield may be magnetically connected to the main pole.

The magnetic head may further include a second coil inducing a magnetic field magnetizing the side shield in the same direction as the main pole.

The first and second coils may be electrically connected in series.

The second coil may receive a current independently of the first coil.

The first coil may encompass a portion of the main pole and the second coil may encompass a portion of the side shield.

The side shield may comprise a first side shield portion and a second side shield portion, and a portion of the main pole may be provided between the first and second side shield portions.

The main pole may have a throat to focus a magnetic field, each of the first and second side shields may have a tip, and a surface of the tip of the first side shield portion may face one side of the throat and a surface of the tip of the second side shield portion may face another side of the throat of the main pole.

The magnetic head may further comprise a sub yoke recessed from an end of the main pole facing toward a recording medium so as to be distant from the recording medium than that of the end of the main pole.

According to another aspect, there is provided a magnetic recording apparatus comprising a recording medium, and a magnetic head for recording data with respect to the recording medium, wherein the magnetic head comprise a main pole, a first coil inducing a magnetic field to the main pole, a side shield having the same direction of magnetization as the main pole in a recording operation, and a return pole forming a magnetic path with the main pole.

The magnetic head may further comprise a read head portion having first and second magnetic shield layers and a magnetic resistance element provided between the first and second magnetic shield layers.

The main pole may have a higher saturation magnetic flux density and/or a lower magnetic permeability than that of the return pole.

The magnetic head may further comprise a sub yoke to focus the magnetic field with respect to an end of the main pole toward the recording medium, wherein the main pole may have a higher saturation magnetic flux density and/or a lower magnetic permeability than that of the sub yoke.

The apparatus may further comprise an actuator comprising an actuator arm, a suspension extended from the actuator arm, and a slider in which the magnetic head is provided, and a motor to drive the actuator.

According to still another aspect, there is provided a recording apparatus comprising a recording medium, and a magnetic head to record data with respect to the recording medium, wherein the magnetic head comprises a recording member to emit a magnetic field toward the recording medium, a field inducing member to induce the magnetic field to the recording member, a return path member to form a magnetic path with the recording member, and a shield member to prevent a distribution of the magnetic field in a track direction, wherein the shield member has the same direction of magnetization as the recording member in a recording operation.

The field inducing member may be a coil wound around the recording member.

According to yet another aspect, there is provided a method of recording in a recording apparatus having a recording medium, a motor, and a magnetic head to record data with respect to the recording medium, the magnetic head comprising a recording member, a field inducing member, a return path member to form a magnetic path with the recording member, and a shield member to prevent a distribution of a magnetic field in a track direction of the recording medium, the method comprising rotating the recording medium by the motor, and performing a recording operation by inducing the magnetic field to the recording member by the field inducing member to emit the magnetic field toward the recording medium, wherein the shield member has the same direction of magnetization as the recording member during the recording operation.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, description of well-known functions and constructions are omitted to increase clarity and conciseness.

Figure 1:
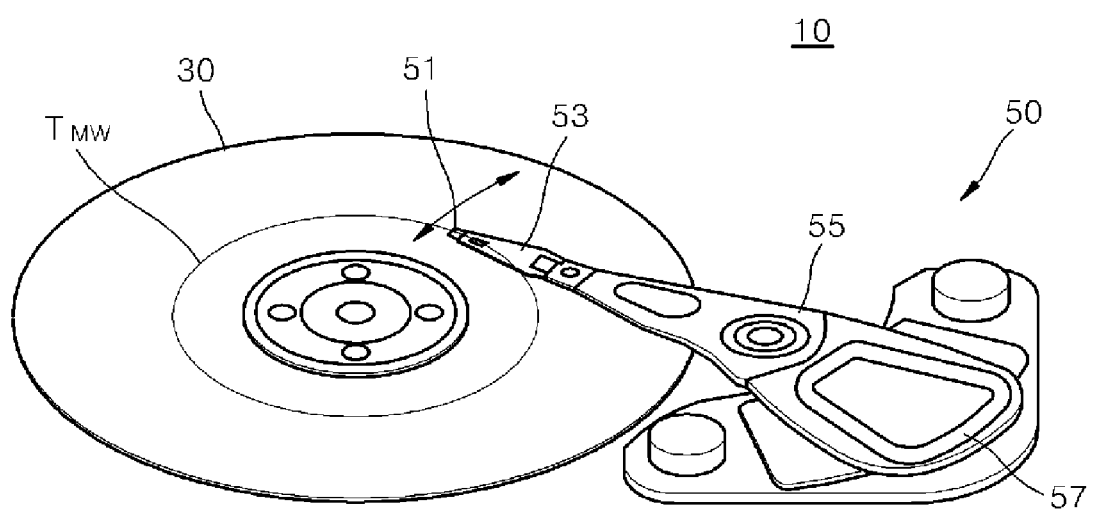
FIG. 1 is a diagram illustrating an exemplary magnetic recording apparatus.

FIG. 1 illustrates a magnetic recording apparatus 10 according to an exemplary embodiment. The magnetic recording apparatus 10 comprises a magnetic recording medium 30 and an actuator 50 having a magnetic head (for example, 100 of FIG. 2).

For example, the magnetic recording medium 30 may be a continuous medium, a discrete track medium, or a pattern medium. A continuous medium is a medium having a continuous magnetic recording layer. A discrete track medium has a structure in which a ring-shaped data track is previously patterned. A pattern medium has a structure in which bits, as minimum recording units, are patterned in the form of an island.

The actuator 50 comprises an actuator arm 55 and a suspension 53 that is extended from the actuator arm 55. A slider 51 in which a magnetic head (for example, 100 of FIG. 2) is installed is attached to an end of the suspension 53. The actuator 50 may be driven by a voice coil motor (VCM) 57.

Figure 2:
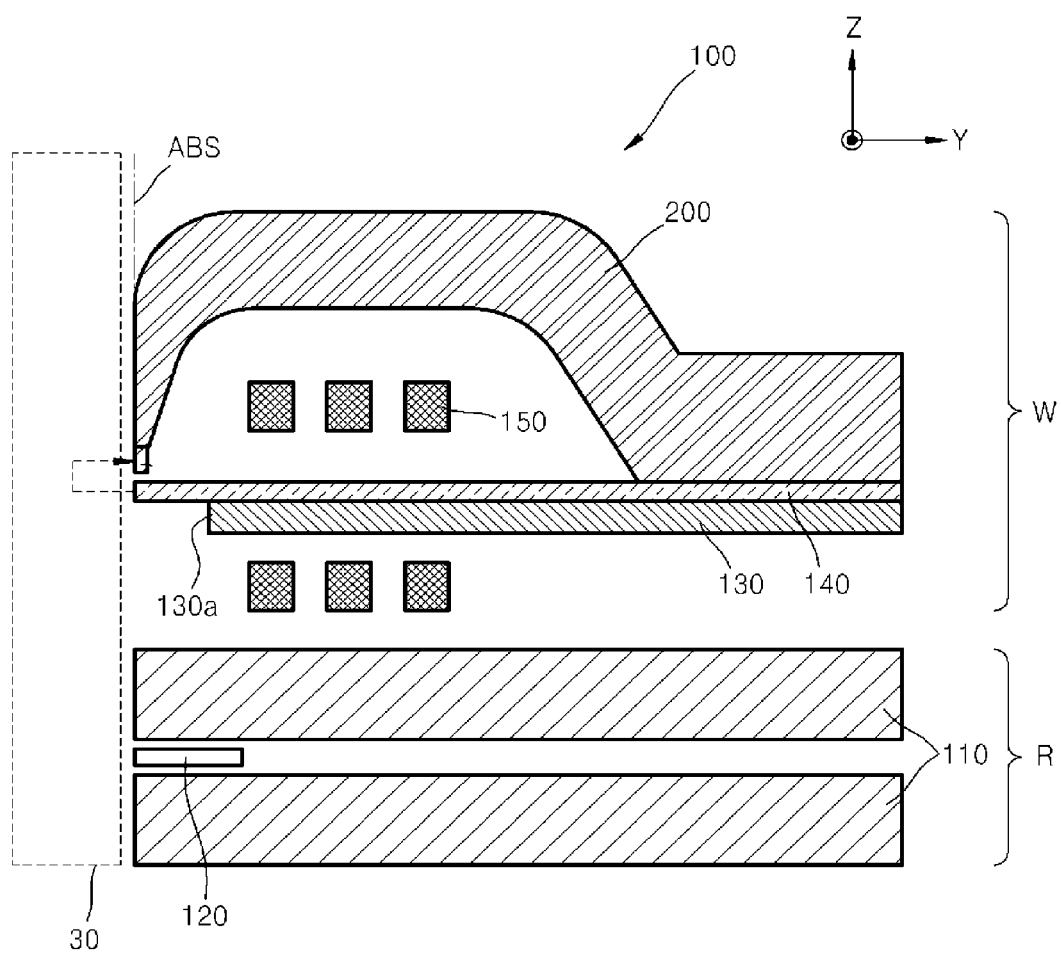
FIG. 2 is a diagram illustrating a cross-sectional view of an exemplary magnetic head.
Figure 3:
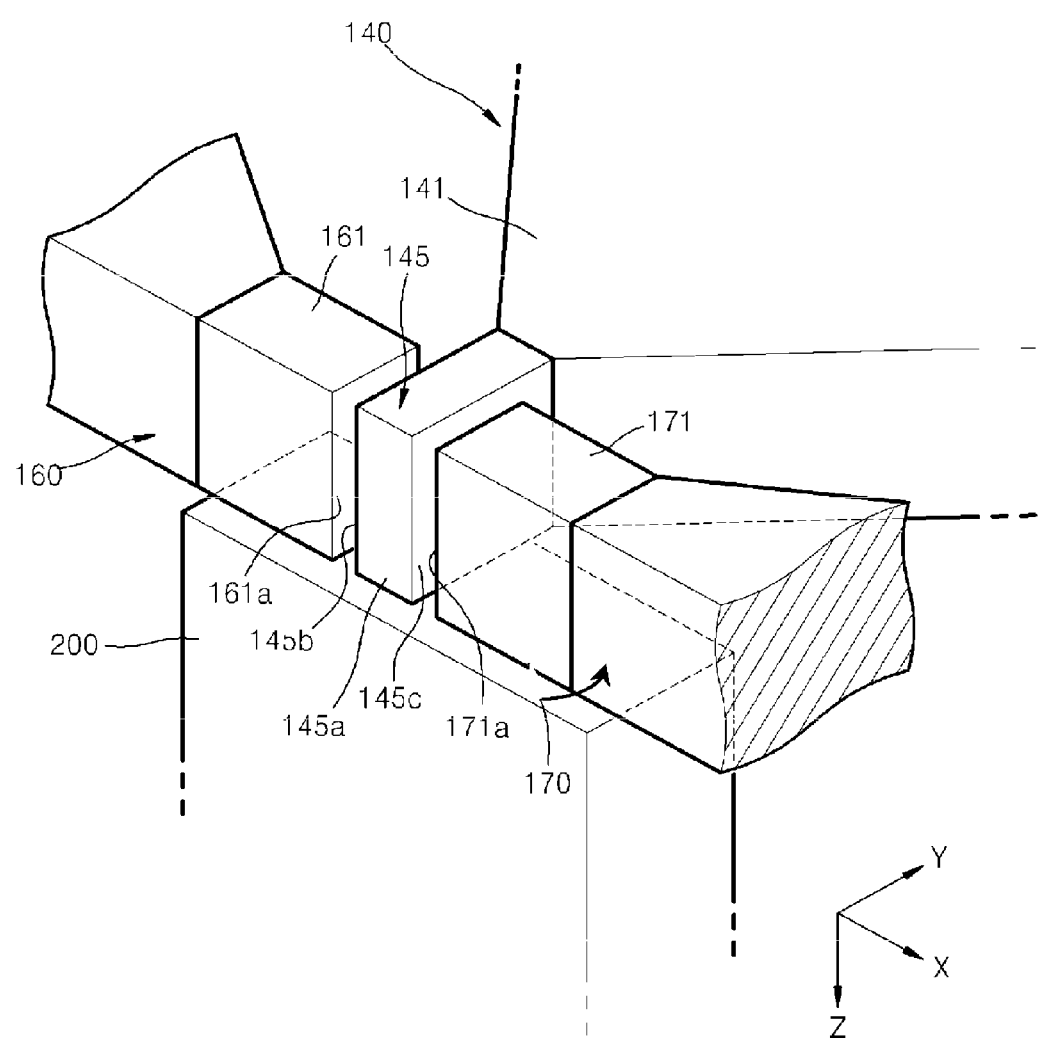
FIG. 3 is a diagram illustrating a perspective view of an exemplary magnetic head.
Figure 4:
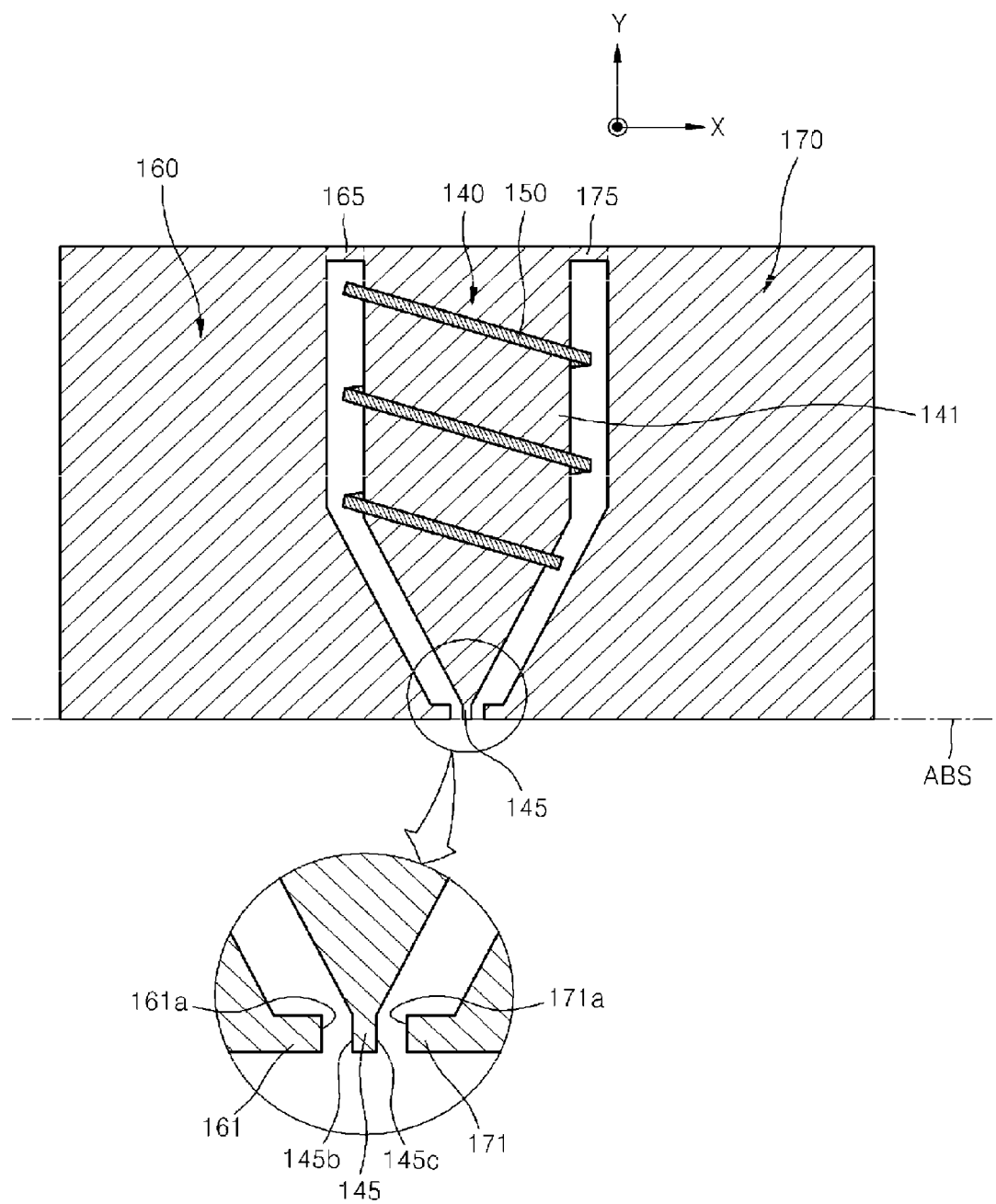
FIG. 4 is a diagram illustrating a plan view of a main pole and side shields of an exemplary magnetic head.

FIG. 2 illustrates a magnetic head 100 according to an exemplary embodiment. FIG. 3 illustrates an enlarged partial perspective view of an exemplary magnetic head in which a magnetic flux emission and return may be performed. FIG. 4 illustrates an exemplary main pole and side shields of a magnetic head according to an exemplary embodiment.

Referring to FIGS. 2 and 4, the magnetic head 100 to be attached to a slider (51 of FIG. 1) is used to record information on the magnetic recording medium 30 that is distanced from an air bearing surface (ABS) by a predetermined distance. The magnetic head 100 comprises a writing head portion W including a main pole 140 providing a magnetic flux to leak to the magnetic recording medium 30, a first coil 150 inducing a magnetic field to the main pole 140 so that a magnetic field for magnetic recording may be emitted toward the magnetic recording medium 30 through an end of the main pole 140, side shields 160 and 170 provided to have the same direction of magnetization as that of the main pole 140 during a recording operation, and a return pole 200 forming a magnetic path (as indicated by a dotted arrow line in FIG. 2) together with the main pole 140.

The writing head portion W of the magnetic head 100 may further comprise a sub yoke 130 that enables a magnetic flux to be focused on an end of the main pole 140 toward the magnetic recording medium 30, that is, an end of the main pole 140 toward the ABS.

The magnetic head 100 may further comprise a reading head portion R including a magnetic resistance element 120 provided between two magnetic shield layers 110, so as to read information recorded on the magnetic recording medium 30.

The main pole 140, the return pole 200, and the sub yoke 130 may be formed of a magnetic material so as to provide a magnetic path for a magnetic field B generated by the first coil 150. In this case, the intensity of a magnetic field focused on an end of the main pole 140 may be limited by a saturation magnetic flux density Bs of the main pole 140. Thus, the main pole 140 may be formed of a magnetic material having a higher saturation magnetic flux density Bs than that of the return pole 200 or the sub yoke 130.

The main pole 140 may be formed of a material such as CoFe, CoNiFe, or NiFe, etc., having a saturation magnetic flux density Bs of about 2.1-about 2.4 T. The sub yoke 130 or the return pole 200 may be formed to have relatively high magnetic permeability than that of the main pole 140 so as to have a fast response characteristic with respect to a change in a magnetic field of a high frequency. The sub yoke 130 or the return pole 200 may be formed of a magnetic material such as NiFe. In this case, a saturation magnetic flux density Bs and magnetic permeability may be properly designed by adjusting the composition of Ni to Fe.

Referring to FIGS. 3 and 4, the main pole 140 comprises a body 141 having a throat 145, i.e., a pole tip, formed at an end of the body 141 towards the magnetic recording medium 30, so that a magnetic field may be focused on the end towards the magnetic recording medium 30. Where a recording current is provided, a magnetic field emitted from the throat 145 performs a magnetic recording with respect to the magnetic recording medium 30. Accordingly, a magnetic recording track ($T_{MW}$ of FIG. 1) is be formed as the magnetic recording medium 30 is rotated.

The sub yoke 130 enables a magnetic field to be focused on the throat 145 of the main pole 140 and may be recessed from a magnetic flux emitting surface 145a of the throat 145 to be distant from the magnetic recording medium 30. In other words, a surface 130a of the sub yoke 130 facing the magnetic recording medium 30 may be formed to be spaced from an end of the main pole 140 toward the ABS to be distant from the ABS. While FIG. 2 illustrates the sub yoke 130 formed on a lower surface of the main pole 140, it is understood that the sub yoke 130 may be formed on an upper surface of the main pole 140.

The first coil 150 may be provided to encompass or boarder the main pole 140 and the sub yoke 130. For example, the first coil 150 may be wound around the main pole 140 and the sub yoke 130 in a predetermined number of times, for example, three times. The shape or the number of turns of the first coil 150 of FIG. 2 is only illustrative, and various modifications and/or alternatives may be suggested to those of ordinary skill in the art. For example, the first coil 150 may be formed in the form of a spiral, solenoid, and so on. It is also understood that the first coil 150 may be provided in a variety of ways and replaced by an alternative that allow a magnetic field to be formed on an end of the main pole 140 toward the ABS, toward the magnetic recording medium 30.

The side shields 160 and 170 may be formed of a magnetic material. The side shields 160 and 170 may be formed of a magnetic material that is the same as a material used to form the return pole 200. In addition, the side shields 160 and 170 may be formed of a magnetic material having a smaller saturation magnetization than that of the return pole 200. It is understood that various magnetic materials may be used to form the side shields 160 and 170.

As shown in FIG. 3, the side shields 160 and 170 may be formed at both sides of the main pole 140 to cross a direction in which the main pole 140 and the return pole 200 are disposed. The side shields 160 and 170 may comprise tips 161 and 171, respectively, disposed at both sides of the throat 145 of the main pole 140 and may have a similar cross-sectional size to the sizes of sides 145b and 145c of the throat 145 of the main pole 140. In this case, the tips 161 and 171 of the side shields 160 and 170 may have surfaces 161a and 171a that face the sides 145b and 145c of the throat 145 of the main pole 140, respectively.

According to an embodiment of FIG. 4, the side shields 160 and 170 are magnetically connected to the main pole 140 by using connection portions 165 and 175, respectively. The connection portions 165 and 175 may be formed of the same magnetic material as the side shields 160 and 170 or the main pole 140, or formed of a different magnetic material therefrom. FIG. 4 illustrates an example in which the side shields 160 and 170 are magnetically connected to the main pole 140 in a portion of the side shields 160 and 170 distant from the ABS. However, the position in which the side shields 160 and 170 and the main pole 140 are magnetically connected is not limited thereto and may be changed.

The above structure in which the main pole 140 is magnetically connected to the side shields 160 and 170 may be manufactured by using the same number of masks and the same process as a process of manufacturing a main pole without any separate process.

The side shields 160 and 170 that are magnetically connected to the main pole 140 are magnetized in the same direction as the main pole 140 during a recording operation.

FIG. 4 illustrates an example in which the side shields 160 and 170 are formed over a wide region to correspond to a portion in which the first coil 150 of the main pole 140 is encompassed. In another embodiment, the side shields 160 and 170 may be formed to be provided in a region near the ABS. For example, the side shields 160 and 170 may be formed to have a narrow and long rod shape, such as a shape extended from the tips 161 and 171 and having, for example, a width that is the same or similar to a length of the throat 145 of the main pole 140.

Due to the side shields 160 and 170 having the same direction of magnetization as the main pole 140, a magnetic flux may be better focused on an end of the main pole 140. In other words, since the side shields 160 and 170 have the same direction of magnetization as the main pole 140 during a recording operation, a magnetic flux emitted to the magnetic recording medium 30 from the main pole 140 is prevented from being inputted to the side shields 160 and 170 and inputted to the return pole 200. Accordingly, the magnetic flux is better focused on the throat 145 of the main pole 140 and the intensity of a magnetic field in the throat 145 of the main pole 140 increases.

Figure 5:
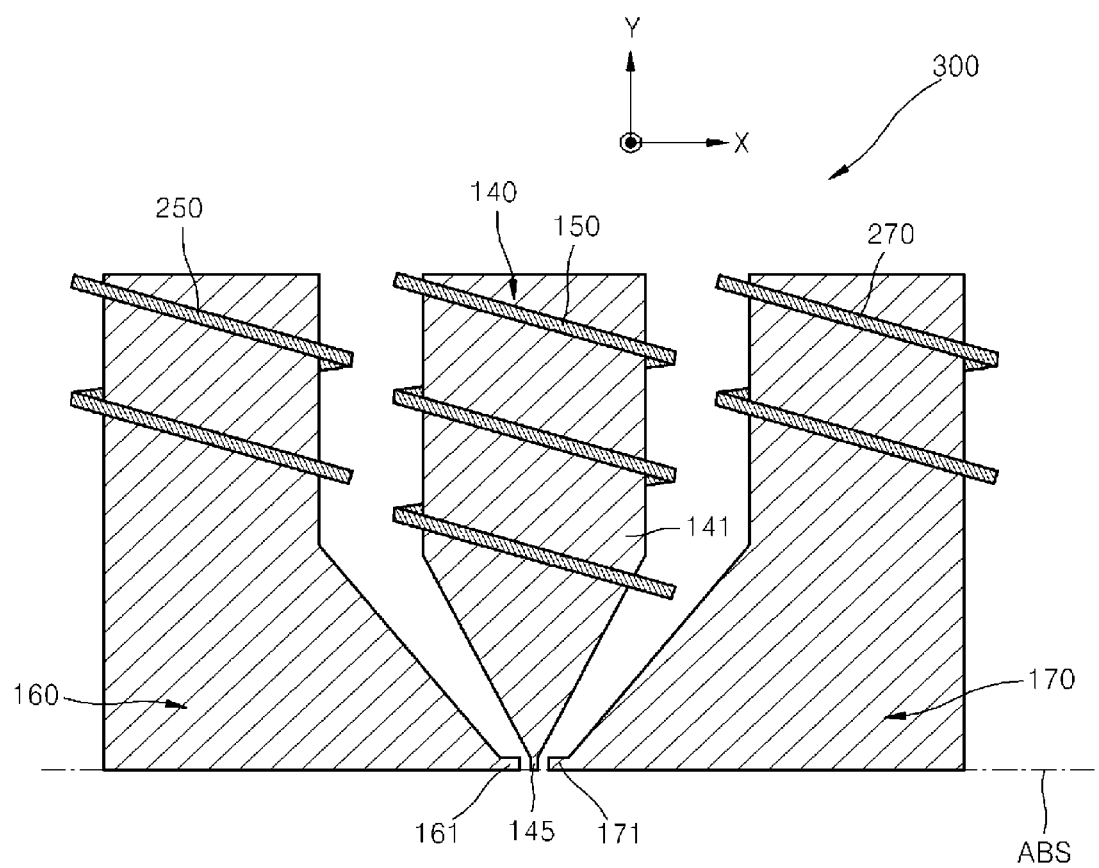
FIG. 5 is a diagram illustrating a plan view of a main pole and side shields of another exemplary magnetic head.

FIG. 5 is a plan view illustrating a magnetic head 300 according to another exemplary embodiment. The structure of the magnetic head 300 is similar to that of the magnetic head 100 illustrated in FIGS. 2 through 4. The difference is that, as shown in FIG. 5, the side shields 160 and 170 are not magnetically connected to the main pole 140 and second coils 250 and 270 are provided inducing a magnetic field magnetizing the side shields 160 and 170 in the same direction as the main pole 140.

The first coil 150 inducing a magnetic field to the main pole 140 and the second coils 250 and 270 inducing a magnetic field magnetizing the side shields 160 and 170 may be wound in the same direction, for example, and the first and second coils 150, 250, and 270 may be electrically connected in series. In this case, since the direction of a magnetic flux induced to the main pole 140 and the direction of a magnetic flux induced to the side shields 160 and 170 are the same, the side shields 160 and 170 may be magnetized in the same direction as the main pole 140.

As another example, currents may be independently applied to the first and second coils 150, 250, and 270, respectively, and the second coils 250 and 270 may be wound in the same direction as the first coil 150 or in a different direction from that of the first coil 150. In this case, the currents applied to the second coils 250 and 270 are controlled so that the magnetic field induced to the side shields 160 and 170 via the second coils 250 and 270 has the same direction as the magnetic field induced to the main pole 140 via the first coil 150. Since the direction of magnetization induced to the main pole 140 and the direction of magnetization induced to the side shields 160 and 170 are the same, the side shields 160 and 170 may be magnetized in the same direction as the main pole 140.

FIG. 5 illustrates the case where the first and second coils 150, 250, and 270 are wound in the same direction.

The second coils 250 and 270 may be the same coil that is formed when the first coil 150 is formed on the main pole 140 and may also be a separate coil.

In the magnetic head 300 of FIG. 5, the first and second coils 150, 250, and 270 may be formed to encompass the main pole 140 and the side shields 160 and 170, respectively. As an example, the first and second coils 150, 250, and 270 may be formed to have a solenoid or spiral shape.

In the magnetic heads 100 and 300, the side shields 160 and 170 have the same magnetization state as the main pole 140 in a recording operation. The return pole 200 has the opposite state of magnetization to the main pole 140. For example, where the main pole 140 is an N pole, the side shields 160 and 170 are N poles, and the return pole 200 is an S pole. Where the main pole 140 is an S pole, the side shields 160 and 170 are S poles, and the return pole 200 is an N pole.

On the other hands, where side shields of a magnetic head are magnetically separated (floated) from peripheral poles or are connected to return poles, the side shields have the opposite state of magnetization to that of a main pole during a recording operation. Where the side shields have the opposite direction of magnetization to that of the main pole, the intensity of a magnetic field of the main pole is reduced as compared to the intensity of a magnetic field of a main pole with corresponding side shields having the same state of magnetization as that of the main pole.

Figure 6:
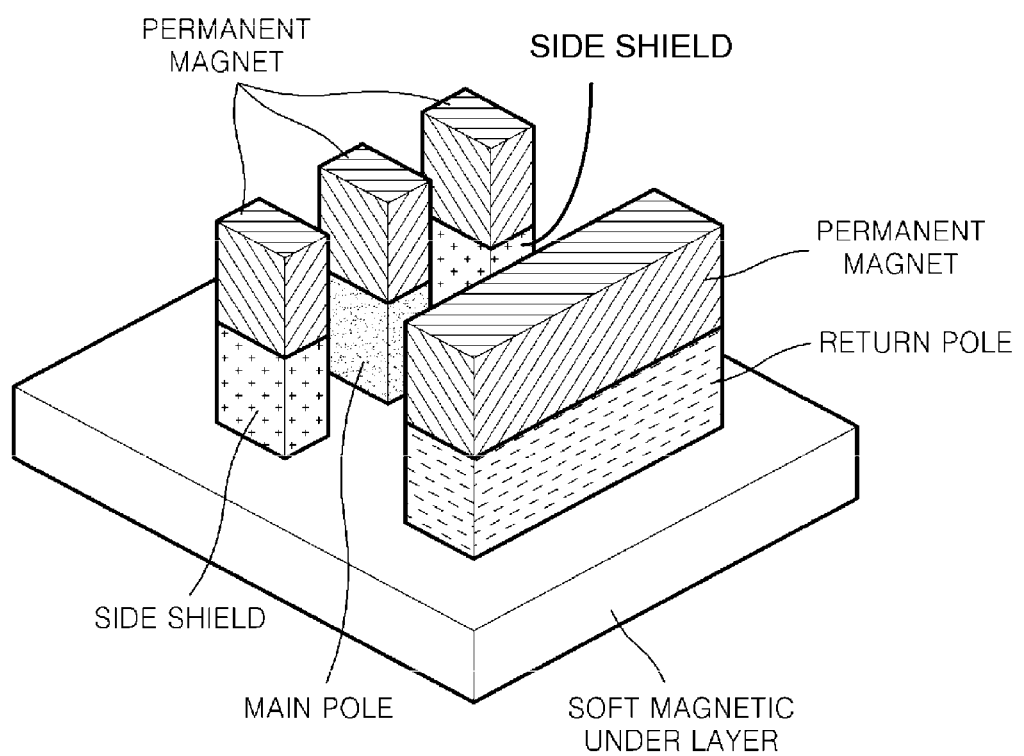
FIG. 6 is a diagram illustrating a perspective view of an exemplary simulation model corresponding to a magnetic head according to an exemplary embodiment.
Figure 7:
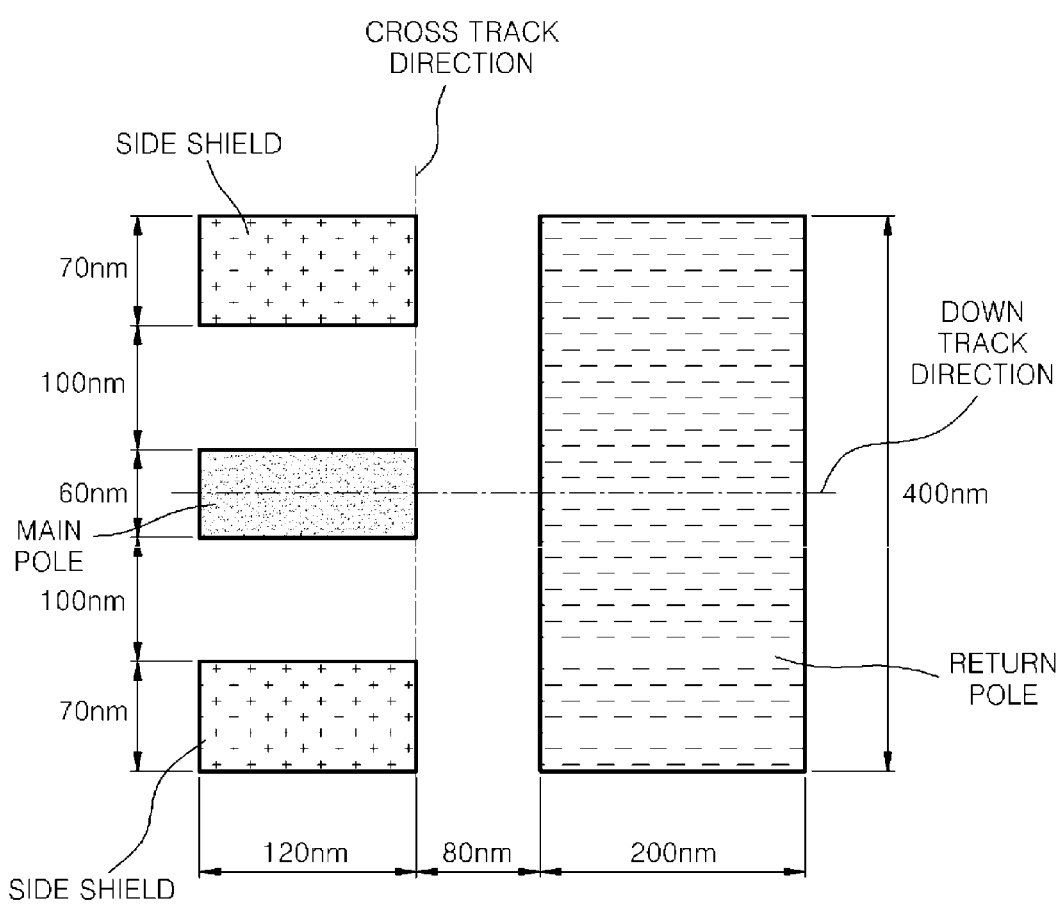
FIG. 7 is a diagram illustrating an exemplary design value of the simulation model of FIG. 6.

FIG. 6 illustrates a model used in a simulation to measure the intensity of a magnetic field of a main pole of a magnetic head according to an exemplary embodiment, and FIG. 7 illustrates an exemplary design value used in the simulation with respect to the model of FIG. 6.

Referring to FIG. 6, a simulation was performed assuming that a permanent magnet was disposed on a main pole, side shields, and a return pole so that a field was generated in the main pole, the side shields, and the return pole, and a soft magnetic underlayer of a magnetic recording medium was disposed under the main pole, the side shields, and the return pole.

Referring to FIG. 7, the head structure of the model (hereinafter, referred to as the exemplary model) of FIG. 6 was based on the design values illustrated in FIG. 7. For comparison, the head structure of a model (hereinafter, referred to as the conventional model) used in the simulation corresponding to a conventional magnetic head was provided to be the same as the head structure of the exemplary model of FIG. 6. Simulation was performed in a state where, in the exemplary model, the distribution of magnetization of the main pole and the side shields was made the same and in the conventional model, the distribution of magnetization of a main pole and side shields was made to be opposite. In the simulation, a write gap was 80 nm, and a distance between the side shields and the main pole was 100 nm, and the width of the main pole was 60 nm. A material used to form the main pole was a material having a saturation magnetization value of 2.4 T, and simulation conditions were controlled to properly control the level of the magnetization value of the side shields.

Figure 8:
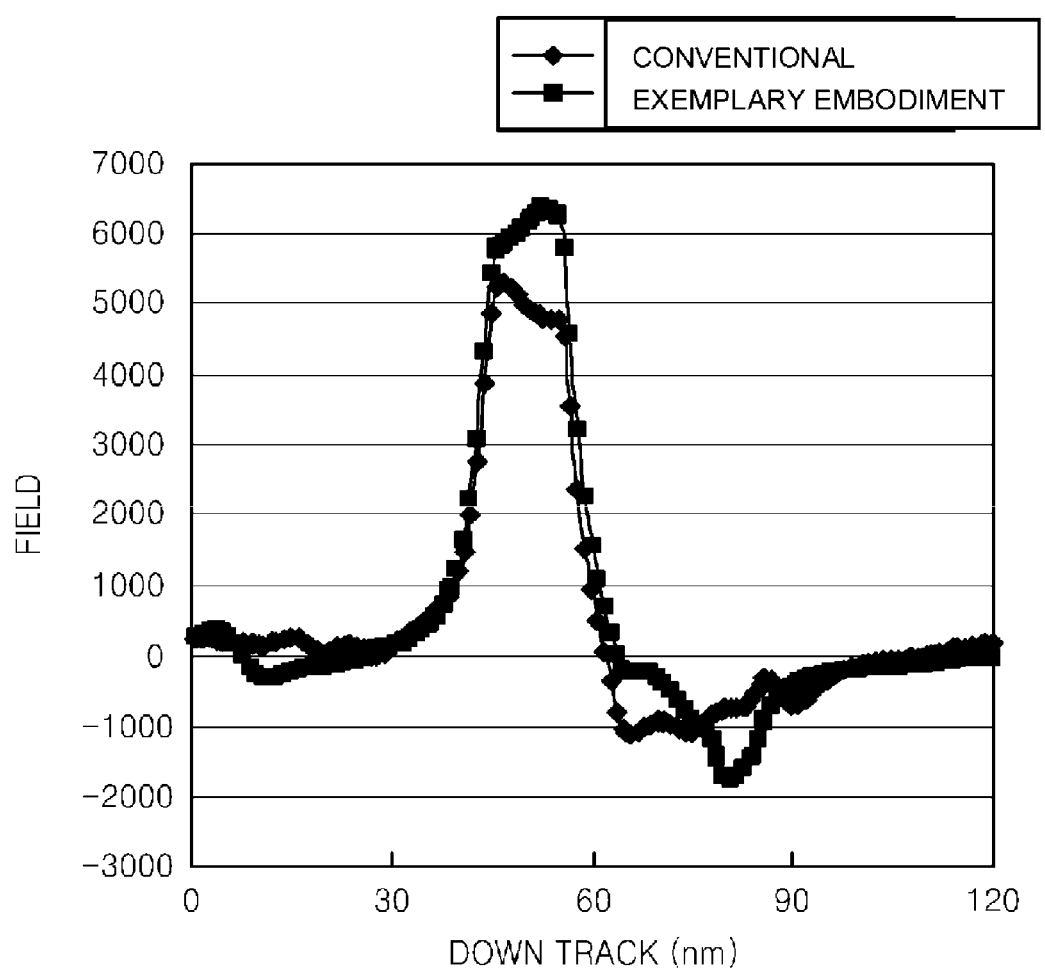
FIG. 8 a diagram illustrating a distribution of a magnetic field in a down track direction; for a model corresponding to a magnetic head according to an exemplary embodiment, and for a model corresponding to a conventional magnetic head.

FIG. 8 illustrates a comparison result of the distribution of a magnetic field in a down track direction (see a dotted line in FIG. 7) of the exemplary model and the conventional model. As shown in FIG. 8, in both the exemplary model (EXEMPLARY EMBODIMENT of FIG. 8) and the conventional model, there is no remarkable change in a field gradient that affects a recording characteristic. However, the size of a magnetic field of the exemplary model is approximately 30% larger than that of the conventional model.

Figure 9:
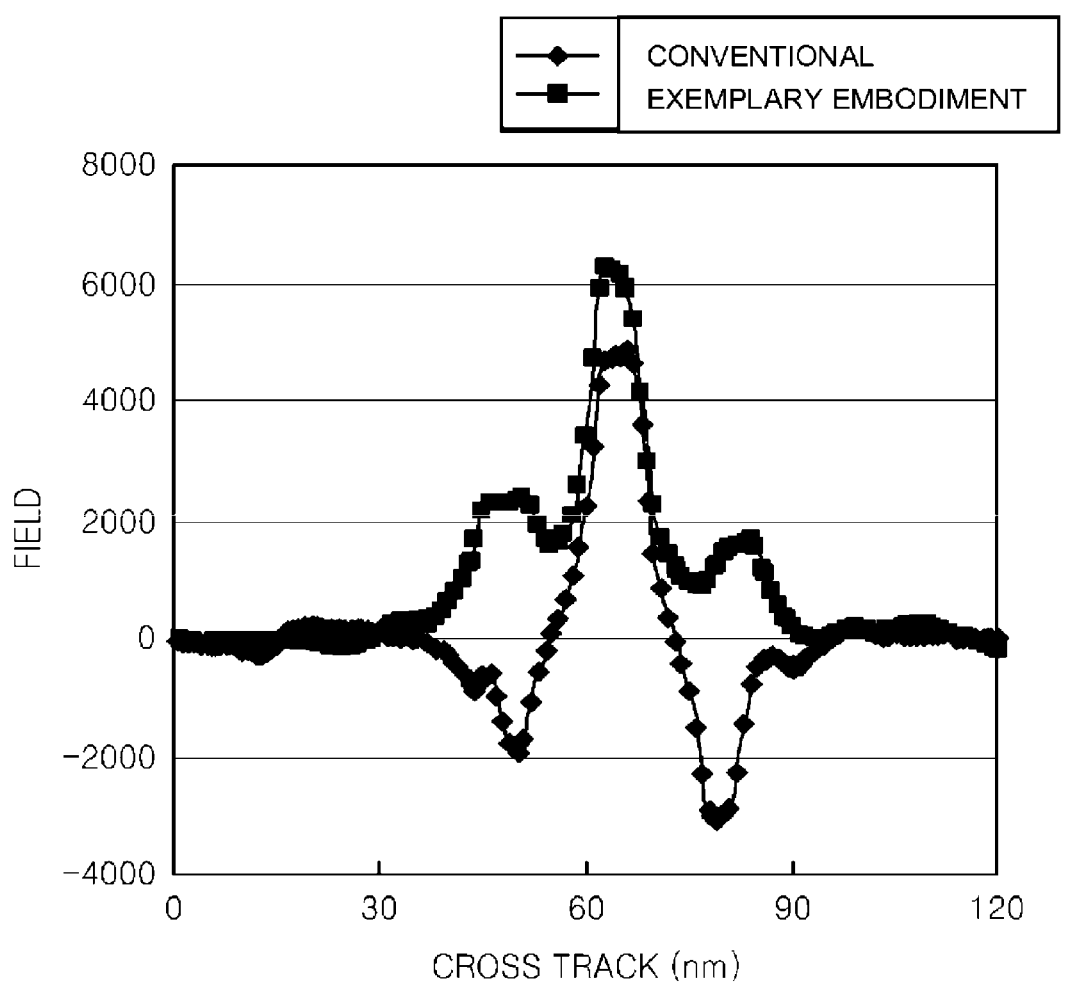
FIG. 9 a diagram illustrating a distribution of a magnetic field in a cross track direction; for a model corresponding to a magnetic head according to an exemplary embodiment, and for a model corresponding to a conventional magnetic head.

FIG. 9 illustrates a comparison result of the distribution of a magnetic field in a cross track direction (see a dotted line in FIG. 7) of the exemplary model (EXEMPLARY EMBODIMENT of FIG. 9) and the conventional model. As shown in FIG. 9, there is no remarkable change in both the exemplary model and the conventional model in the distribution of a magnetic field in the cross track direction; except that the polarity of a field with respect to side shields is opposite to each other. In FIG. 9, since the direction of magnetization of the side shields and the main pole was the same in the exemplary model, the polarity of a field (middle peak) with respect to the main pole and the polarity of a field (both-side peak) with respect to the side shields are the same. On the other hand, since the direction of magnetization of the side shields and the main pole was opposite to each other in the conventional model, the polarity of a field with respect to the main pole and the polarity of a field with respect to the side shields are opposite to each other.

According to certain embodiments described above, side shields may be provided to have the magnetization in the same direction as a main pole so as to increase the intensity of a magnetic field without largely effecting the distribution of the magnetic field.

The methods described herein may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations and methods described herein.

It is understood that the terminology used herein may be different in other applications or when described by another ordinary skilled in the art.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A magnetic head for recording data with respect to a recording medium, comprising:
   a main pole;
   a first coil inducing a magnetic field to the main pole;
   a side shield having the same direction of magnetization as the main pole in a recording operation;
   a return pole forming a magnetic path with the main pole; and
   a second coil inducing a magnetic field magnetizing the side shield in the same direction as the main pole.

2. The magnetic head of claim 1, wherein the side shield is magnetically connected to the main pole.

3. The magnetic head of claim 1, wherein the first and second coils are electrically connected in series.

4. The magnetic head of claim 1, wherein the second coil receives a current independently of the first coil.

5. The magnetic head of claim 1, wherein the first coil encompasses a portion of the main pole and the second coil encompasses a portion of the side shield.

6. The magnetic head of claim 1, wherein the side shield comprises a first side shield portion and a second side shield portion, and a portion of the main pole is provided between the first and second side shield portions.

7. The magnetic head of claim 1, further comprising a sub yoke recessed from an end of the main pole facing toward the recording medium so as to be distant from the recording medium than that of the end of the main pole.

8. A magnetic head for recording data with respect to a recording medium, comprising:
   a main pole;
   a first coil inducing a magnetic field to the main pole;
   a side shield having the same direction of magnetization as the main pole in a recording operation; and
   a return pole forming a magnetic path with the main pole, wherein:
   the side shield comprises a first side shield portion and a second side shield portion,
   a portion of the main pole is provided between the first and second side shield portions,
   the main pole comprises a throat to focus a magnetic field,
   each of the first and second side shield portions comprises a tip, and
   a surface of the tip of the first side shield portion faces one side of the throat and a surface of the tip of the second side shield portion faces another side of the throat.

9. A magnetic recording apparatus comprising:
   a recording medium; and
   a magnetic head for recording data with respect to the recording medium,
   wherein the magnetic head comprises:
      a main pole,
      a first coil inducing a magnetic field to the main pole,
      a side shield having the same direction of magnetization as the main pole in a recording operation,
      a return pole forming a magnetic path with the main pole, and
      a second coil inducing a magnetic field magnetizing the side shield in the same direction as the main pole.

10. The apparatus of claim 9, wherein the side shield is magnetically connected to the main pole.

11. The apparatus of claim 9, wherein the first and second coils are electrically connected in series.

12. The apparatus of claim 9, wherein the second coil receives a current independently of the first coil.

13. The apparatus of claim 9, wherein the first coil encompasses a portion of the main pole and the second coil encompasses a portion of the side shields.

14. The apparatus of claim 9, wherein the side shield comprises a first side shield portion and a second side shield portion, and a portion of the main pole is provided between the first and second side shield portions.

15. The apparatus of claim 9, wherein the magnetic head further comprises a sub yoke recessed from an end of the main pole toward the magnetic recording medium so as to be distant from the magnetic recording medium than that of the end of the main pole.

16. The apparatus of claim 9, wherein the magnetic head further comprises a read head portion having first and second magnetic shield layers and a magnetic resistance element provided between the first and second magnetic shield layers.

17. The apparatus of claim 9, wherein the main pole has a higher saturation magnetic flux density and/or a lower magnetic permeability than that of the return pole.

18. The apparatus of claim 9, wherein the magnetic head further comprises a sub yoke to focus the magnetic field with respect to an end of the main pole toward the recording medium, wherein the main pole has a higher saturation magnetic flux density and/or a lower magnetic permeability than that of the sub yoke.

19. The apparatus of claim 9, further comprising:
   an actuator comprising an actuator arm, a suspension extended from the actuator arm, and a slider in which the magnetic head is provided; and
   a motor to drive the actuator.

20. A magnetic recording apparatus comprising:
   a recording medium; and
   a magnetic head for recording data with respect to the recording medium,
   wherein the magnetic head comprises:
      a main pole,
      a first coil inducing a magnetic field to the main pole,
      a side shield having the same direction of magnetization as the main pole in a recording operation, and
      a return pole forming a magnetic path with the main pole,
   wherein the side shield comprises a first side shield portion and a second side shield portion, and a portion of the main pole is provided between the first and second side shield portions, and
   wherein:
      the main pole comprises a throat to focus a magnetic field,
      each of the first and second the side shield portions comprises a tip, and
      a surface of the tip of the first side shield portion faces one side of the throat and a surface of the tip of the second side shield portion faces another side of the throat.

* * * * *